United States Patent
Vernier et al.

(10) Patent No.: US 10,936,264 B2
(45) Date of Patent: Mar. 2, 2021

(54) AUTOMATIC SCALING FOR LEGIBILITY

(71) Applicant: International Business Machines Corporation, Armonk, NY (US)

(72) Inventors: Stanley John Vernier, Grove City, OH (US); Stephen Arthur Boxwell, Franklin, OH (US); Kyle Matthew Brake, Dublin, OH (US); Keith Gregory Frost, Delaware, OH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/542,413

(22) Filed: Aug. 16, 2019

(65) Prior Publication Data
US 2020/0401359 A1    Dec. 24, 2020

Related U.S. Application Data

(63) Continuation of application No. 16/446,982, filed on Jun. 20, 2019.

(51) Int. Cl.
*G06F 3/12*    (2006.01)

(52) U.S. Cl.
CPC .......... *G06F 3/1256* (2013.01); *G06F 3/1208* (2013.01); *G06F 3/1298* (2013.01)

(58) Field of Classification Search
CPC .............................. G06F 3/1256; G06F 3/1208
See application file for complete search history.

(56) References Cited

U.S. PATENT DOCUMENTS

| | | | |
|---|---|---|---|
| 6,047,093 A | 4/2000 | Lopresti | |
| 6,275,304 B1 | 8/2001 | Eschbach | |
| 7,466,875 B1 * | 12/2008 | Siegel | G06K 9/036 358/1.2 |
| 7,898,696 B2 | 3/2011 | Marchesotti | |
| 8,170,290 B2 | 5/2012 | Rauh | |
| 8,218,160 B2 | 7/2012 | Ferlitsch | |
| 8,335,789 B2 | 12/2012 | Hull | |
| 8,373,905 B2 | 2/2013 | Erol | |
| 8,755,629 B2 | 6/2014 | Bever | |
| 9,785,830 B2 | 10/2017 | Hausmann | |
| 9,880,915 B2 | 1/2018 | Baril | |
| 10,235,346 B2 | 3/2019 | Lefebvre | |

(Continued)

OTHER PUBLICATIONS

IBM Appendix P., "List of IBM Patents or Patent Applications to be Treated as Related", Dated Herewith, 2 pages.

(Continued)

*Primary Examiner* — Ibrahim Siddo
(74) *Attorney, Agent, or Firm* — William E. Schiesser; Aaron N. Pontikos

(57) ABSTRACT

A method, computer program product and computer system to improve print legibility is provided. A processor receives a file to print. A processor generates a print preview of the file, wherein the print preview is generated at an initial scale. A processor generates a preview text for the print preview. A processor determines a legibility metric based for the print preview on a comparison between the preview text for the print preview and text of the file to print. A processor prints the file at a second scale in response to the legibility metric being below a predetermined value, wherein the second scale is larger than the initial scale.

5 Claims, 4 Drawing Sheets

(56) References Cited

U.S. PATENT DOCUMENTS

| | | | |
|---|---|---|---|
| 2008/0267503 A1* | 10/2008 | Denoue | G06K 9/033 |
| | | | 382/177 |
| 2012/0166414 A1 | 6/2012 | Decker | |
| 2012/0300225 A1 | 11/2012 | Scrafford | |
| 2017/0068709 A1* | 3/2017 | Dasgupta | G06F 16/35 |
| 2017/0187894 A1* | 6/2017 | Zhang | G06F 3/1261 |

OTHER PUBLICATIONS

Mei et al., "Statistical learning for OCR text correction", arXiv:1611.06950v1 [cs.CV], Nov. 21, 2016, 10 pages.

Vernier et al., "Automatic Scaling for Legibility", U.S. Appl. No. 16/446,982, filed Jun. 20, 2019, pp. 1-22.

* cited by examiner

AUTOMATIC SCALING FOR LEGIBILITY

BACKGROUND OF THE INVENTION

The present invention relates generally to the field of document presentation and digital printing, and more particularly to automatic scaling for legibility of a document.

Digital printing is the process of taking image or document data to create a copy. The copy can be a printed version of the image or document. The copy can be a digital file for document presentation, such as a portable document format or PDF. In both cases, digital printing converts images and other document data to a format that reproduces the images and other document data to create the copy.

SUMMARY

Embodiments of the present invention provide a method, system, and program product to improve print legibility. A processor receives a file to print. A processor generates a print preview of the file, wherein the print preview is generated at an initial scale. A processor generates a preview text for the print preview. A processor determines a legibility metric based for the print preview on a comparison between the preview text for the print preview and text of the file to print. A processor prints the file at a second scale in response to the legibility metric being below a predetermined value, wherein the second scale is larger than the initial scale.

DETAILED DESCRIPTION

Figure 1:
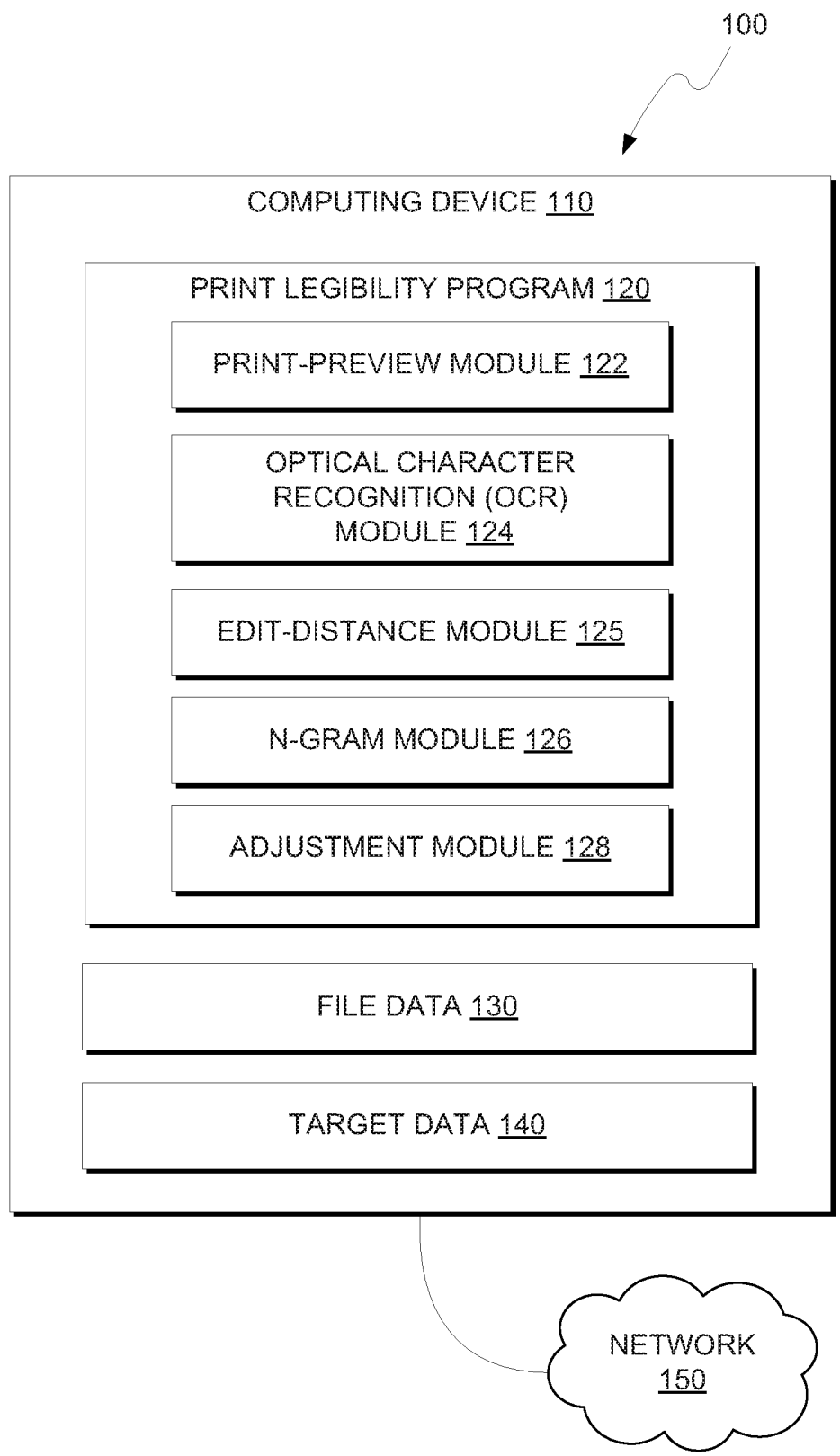
FIG. 1 is a functional block diagram illustrating a networked environment, in accordance with an exemplary embodiment of the present invention.

When printing to a target device or format, many factors influence the resulting output's quality, such as print area or display size of the target output form. In printer devices, as well as digital document containers, a resolution or dots per inch (DPI) setting also impacts the output's quality or legibility of the text. Many prior solutions default the resolution or DPI setting to the lowest value to save on ink or minimize file size. Many users do not recognize the lower quality until after the process of digital printing has finished, forcing the user to manually update the resolution or DPI and repeat the process again.

Embodiments to the present invention provide an automatic process for detecting and altering the scaling of the printing output such that the text output for the digital printing is readable or legible. In various embodiments of the invention, a print preview is generated at a default scale. Based on various analysis of the print preview, embodiments of the present invention determine a legibility metric for the printing output. If the legibility metric is below a certain value, then embodiments of the present invention increase the scaling of the document prior to the document being sent to the output device for printing. Embodiments to the present invention provide improvements to the legibility of printing output by automatically detecting the legibility of the output prior to creation without the need for the user to reprint or repeat the process, ensuring legible output prior to being sent for printing.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating networked environment, generally designated 100, in accordance with one embodiment of the present invention. Networked environment 100 includes computing device 110 connected over network 150. Computing device 110 includes print legibility program 120, file data 130 and target data 140. Print legibility program 120 includes print-preview module 122, optical character recognition (OCR) module 124, edit-distance module 125, n-gram module 126 and adjustment module 128.

In various embodiments of the present invention, computing device 110 is a computing device that can be a standalone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to file data 130 and target data 140 and is capable of executing print legibility program 120. Computing device 110 may include internal and external hardware components, as depicted and described in further detail with respect to FIG. 4.

In this exemplary embodiment, print legibility program 120, file data 130 and target data 140 are stored on computing device 110. However, in other embodiments, print legibility program 120, file data 130 and target data 140 may be stored externally and accessed through a communication network, such as network 150. Network 150 can be, for example, a local area network (LAN), a wide area network (WAN) such as the Internet, or a combination of the two, and may include wired, wireless, fiber optic or any other connection known in the art. In general, network 150 can be any combination of connections and protocols that will support communications between computing device 110 and other devices (not shown) connected to network 150, in accordance with a desired embodiment of the present invention.

In various embodiments, print legibility program 120 determines a legibility metric for a document or file to be printed to a target device. Based on the legibility metric being below a threshold value, print legibility program 120 increases the scaling for the document prior to be printed to the target device. In some embodiments, print legibility program 120 is a stand-alone application that a user provides an indication of a file from file data 130 to be printed. In other embodiments, print legibility program 120 is an add-on, extension, plug-in, application programming interface (API) or the like that is integrated into or included alongside another application, such as a word processor or photo editor, which provides the file to be printed to print legibility program 120.

In various embodiments, print legibility program 120 has access to file data 130. File data 130 includes a variety of file types such as, but not limited to, text documents, images, word processing documents, or any file that can be printed. Print legibility program 120 has access to target data 140. Target data 140 includes information indicating the requirements, restrictions, limits of any output devices that can be selected to produce a printed copy of file data 130. For example, target data 140 includes a print area (e.g., target margins), print size (e.g., target document's dimensions), print resolution (e.g., dots per inch (DPI)), and other indicative information regarding the capabilities or limitations of an output device when printing a file. In some embodiments, target data 140 includes information regarding the capabilities or limitations of a virtual printer software application, such as a portable document format (PDF) file, such as supported DPI or print area sizes.

In various embodiments, print legibility program 120 includes print-preview module 122. Print-preview module 122 generates a preview of the document or file to be printed based on the target data 140 of a target device. For example, print-preview module 122 generates a print preview based on a target device's selected print area, size, or dimensions of the printed output. In some scenarios, target data 140 includes default or preferred values of the target device (e.g., 8"×11" or A4 print size) that print-preview module 122 utilizes when generating a print preview. In other scenarios, print-preview module 122 is provided preferred values of the target device by a user or by another application (e.g., a word processor).

Based on the target data 140 for a selected device to print file data 130, print-preview module 122 generates a preview of the file to be printed. Based on the target data 140 for the device, print legibility program 120 selects a default scale for the print preview. For example, print legibility program 120 selects a default scale of 100% or 1:1. Print legibility program 120 generates a print preview that is an image or render of the file that has the display area and resolution of the target data 140 that would typically be sent to the target device for printing. However, embodiments of the invention provide additional functionality to check if the print preview is legible given the current selection of target data 140.

In various embodiments, print legibility program 120 includes optical character recognition (OCR) module 124. OCR module 124 converts the image produced by print-preview module to text. OCR is a machine vision process that converts images with text to a computer readable format of the optically recognized text. Once the text is converted by OCR module 124, print legibility program 120 determines a legibility metric for the current print preview by comparing the original's file text to the converted text generated by OCR module 124.

In various embodiments, print legibility program 120 includes edit-distance module 125. In various embodiments, edit-distance module 125 determines an edit-distance between the file's text and the OCR text for the print preview, or preview text. Edit-distance is metric that quantifies the number of changes or edits need to be made for one string of text to match another. Specifically, edit-distance is a count of the number of changes that need to be made to the preview text to match the file's original text. For example, the original file has a single sentence of "The quick brown fox jumps over the lazy dog" and OCR module 124 produces an output of "The puick drown fox jump over the lazy dog". In this example, the "q" from quick is recognized as the letter "p", "b" from brown is recognized as a "d", and the letter "s" from "jumps" was not recognized or provided in the preview text. As a result, in this example edit-distance module 125 determines the edit distance would be three (3) between the file's text and the preview text. For an OCR of a print preview that has a large edit-distance from the original text, print legibility program 120 determines that the print preview, and subsequent printing, would be illegible or hard for a user to read once printed. As will be discussed herein, print legibility program 120 alters scaling of the file to be printed in response to edit distance being above a threshold value.

In various embodiments, print legibility program 120 includes N-gram module 126. N-grams are sub-sequences of items of a certain length. For example, a six (6) sequence n-gram (i.e., a "6-gram") would be each five-word sequence n-gram (i.e., a "6-gram") would be each five-word sequence found in a document. In this example, if a file has a single sentence "The quick brown fox jumps over the lazy dog", then four 6-grams would be extracted (i.e., "The quick brown fox jumps over", "quick brown fox jumps over the", "brown fox jumps over the lazy", and "fox jumps over the lazy dog"), where each six word long sub-sequence is extracted from the file.

In various embodiments, generates various n-grams of varying lengths (e.g., 2-grams, 3-grams, 4-grams, etc.) for both the original file's text and the preview text of the print preview at the current scale. N-gram module 126 determines the number of matching n-grams between both the original file's text and the preview text, where matching n-gram sequences in the OCR are "recalled" from the original text. For example, two 3-grams have been extracted from the original file text and the preview text of the print preview. For the original file's text, the two 3-grams are "The quick brown" and "brown fox jumps". For the preview text, the two 3-grams are "The quick brown" and "brown fox jumbs". In this example, the "The quick brown" is correctly recalled, or matches the n-gram of the original file. However, the second 3-gram "brown fox jumbs", is not and therefore does not match, or is recalled in the preview text. As such for this example, one (1) matching, or recalled, n-gram is determined.

In various embodiments, for comparisons the have an amount of matching or recalled n-grams being below a certain threshold, print legibility program 120 determines that the print preview, and subsequent printing, would be illegible or hard for a user to read once printed. As will be discussed herein, print legibility program 120 alters scaling of the file to be printed in response to the amount of recalled n-grams being below a threshold value. One of ordinary skill in the art will appreciate that any variety of n-gram length (i.e., n=1, 2, . . . etc.) or selection thereof may be used without deviating from the invention.

In some embodiments, print legibility program 120 determines a legibility metric based on the edit distance between the file's text and the preview text. As the edit distance increases (indicating more differences between the two texts), print legibility program 120 decreases the legibility metric for the print preview at the current scale. In some embodiments, print legibility program 120 determines a legibility metric based on the number of recalled n-grams between the file's text and the preview text. As the recalled n-grams increase (indicating fewer differences between the two texts), print legibility program 120 increases the legibility metric for the print preview at the current scale. In further embodiments, print legibility program 120 includes both edit distance and recalled n-grams in the determination of a legibility metric for the print preview at the current scale. For example, print legibility program 120 combines both edit distance and recalled n-grams as a weighted average.

In various embodiments, print legibility program 120 includes adjustment module 128. Adjustment module 128 of adjusts the scaling of the document, or elements of the documents, based on the determined legibility score. If the legibility score is above a threshold value, then adjustment module 128sends the document to be printed to the target device at the current determined scale for legible printing. If the legibility score is below a threshold value, then adjustment module 128 increases the scaling for document and repeats the processes discussed herein, where the new increased scale is set as the current scale for print legibility program 120.

In various embodiments, target data 140 includes a range of scale values for the target device. When the eligibility score is below a threshold value, print legibility program 120 increases the current scale based on the range of scale values for the target device. If no increase in scale factor is possible, then print legibility program 120 generates a message informing the user printing the file that legibility issues may exist when printing.

In some scenarios, portions of the file to be printed include vector-based font or vector drawings. In such scenarios, print legibility program 120 re-renders the print image and the font or drawings are redrawn at the higher scale factor. In other scenarios, portion of the file may include image files with text that was found to be illegible by print legibility program 120. In such scenarios, print legibility program 120 performs one or more scaling operations to the image including, but not limited to, nearest-neighbor interpolation, bilinear interpolation, mipmaps, vectorization, or machine learning. One of ordinary skill in the art will appreciate that print legibility program 120 may increase the current scale of a file to be printed based on any known scaling techniques as discussed above or to be later discovered, without deviating from the invention.

In various embodiments, print legibility program 120 repeats the process of generating a print-preview at a current scale, evaluating the print-preview for legibility, and adjusting the current scale until the legibility score is above a threshold value. In some embodiments, print legibility program 120 determines legibility for one or more zones of the file. If a zone or section of the file to be printed has a lower legibility score than another zone, then print legibility program 120 increases the scaling for that zone, while keeping the scaling for other legible portions at the previous value.

Figure 2:
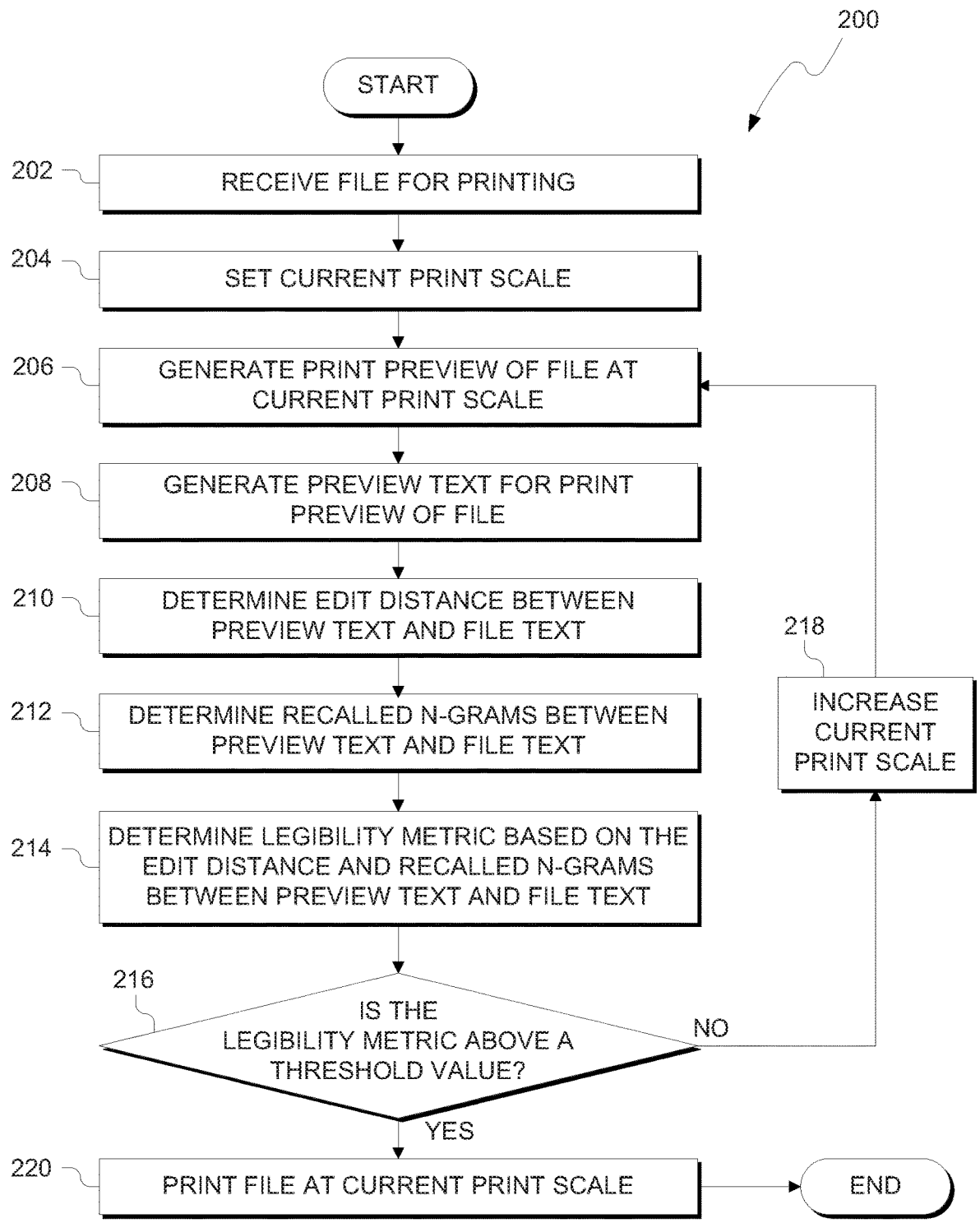
FIG. 2 illustrates operational processes of a print legibility program, on a computing device within the environment of FIG. 1, in accordance with an exemplary embodiment of the present invention.

FIG. 2 illustrates operational processes, designated as 200, of print legibility program 120. In process 202, print legibility program 120 receives a file for printing. In some scenarios, print legibility program 120 is a stand-alone application that a user provides indication of the file's location in file data 130. In other scenarios, print legibility program 120 is an add-on to another program that is provided the file when the user chooses to print the file in the program. In some scenarios, print legibility program 120 receives a target device with the request to print a file. In other scenarios, print legibility program 120 selects a default target device.

In process 204, print legibility program 120 sets the current print scale for the file to an initial scale. In some scenarios, target data 140 includes a default or initial scale value for a target device. In other scenarios, print legibility program 120 receives an initial scale from the user when the print request is received. In process 206, print legibility program 120 generates a print-preview of the file at the current print scale. The print-preview module 122 generates an image file to be sent to a target device for printing.

In process 208, print legibility program 120 generates a text file of the print-preview image printed at the current scale. OCR module 124 converts the image of text in (process 206) to a computer readable text format, generating the preview text. In process 210, print legibility program 120 determines an edit distance between the preview text and the file text based on the number of edits or changes needed to be made in order to make the preview text match the file text. In process 212, print legibility program 120 determines the recalled n-grams between the preview text and the file text. A recalled n-gram is a sequence of "n" length words that appears in both the preview text and the file text.

In process 214, print legibility program 120 determines a legibility metric for the print preview at the current scale. Based on the edit-distance and recalled n-grams between the preview text and file text, print legibility program 120 determines a legibility metric to indicates the legibility of the file to be printed at the current scale. If the legibility metric is above a threshold value (YES Branch of process 216), then print legibility program 120 sends the file to the target device for printing at the current scale (process 220).

If the legibility metric is below a threshold value (NO Branch of process 216), then print legibility program 120 increase the current print scale for the file (process 218). Print legibility program 120 generates a new print preview (process 206) at the increased scale and determines a legibility metric at the increased scale (process 208-216). After each iteration, print legibility program 120 determines if the legibility metric at the increased scale is above a threshold value (process 216), increasing the print scale (process 218) until the legibility score is above the threshold value.

Figure 3:
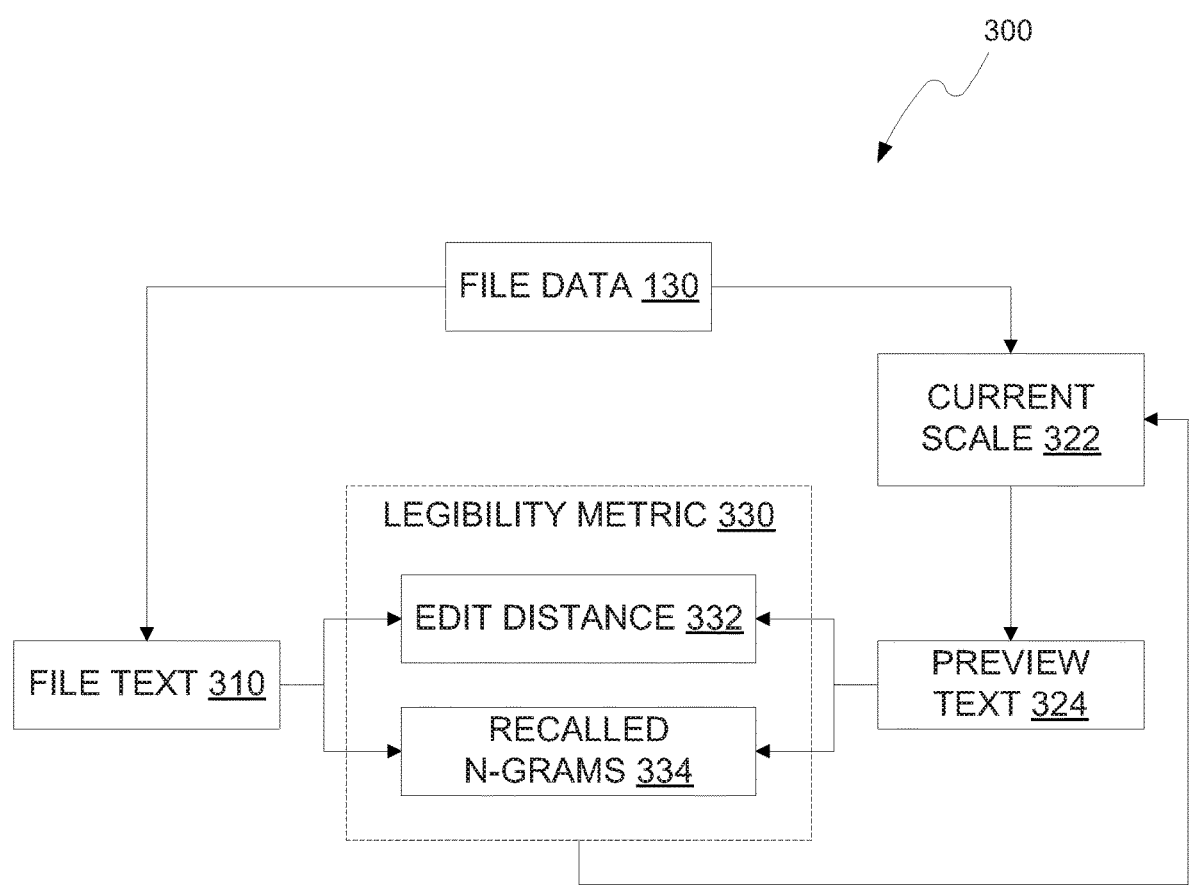
FIG. 3 illustrates a flow diagram of a print legibility program, on a computing device within the environment of FIG. 1, in accordance with an exemplary embodiment of the present invention.

FIG. 3 illustrates a flow diagram 300 of print legibility program 120. In various embodiments, print legibility program 120 is provided file data 130. Print legibility program 120 extracts the text from the original file as file text 310. Print legibility program 120 prints the file at current scale 322. Print legibility program 120 performs optical character recognition (OCR) on the print preview at current scale 322 to generate preview text 324. Print legibility program 120 compares both file text 310 and preview text 324 to determine a legibility metric 330 for the print preview at current scale 322. Legibility metric 330 is based on, either collectively or separately, on edit distance 332 and recalled n-grams 334 determined based on the comparison of file text 310 and preview text 324. Legibility metric 330 affects current scale 322. If print legibility program 120 determines legibility metric 330 is below a threshold value, then print legibility program 120 increases current scale 322.

Figure 4:
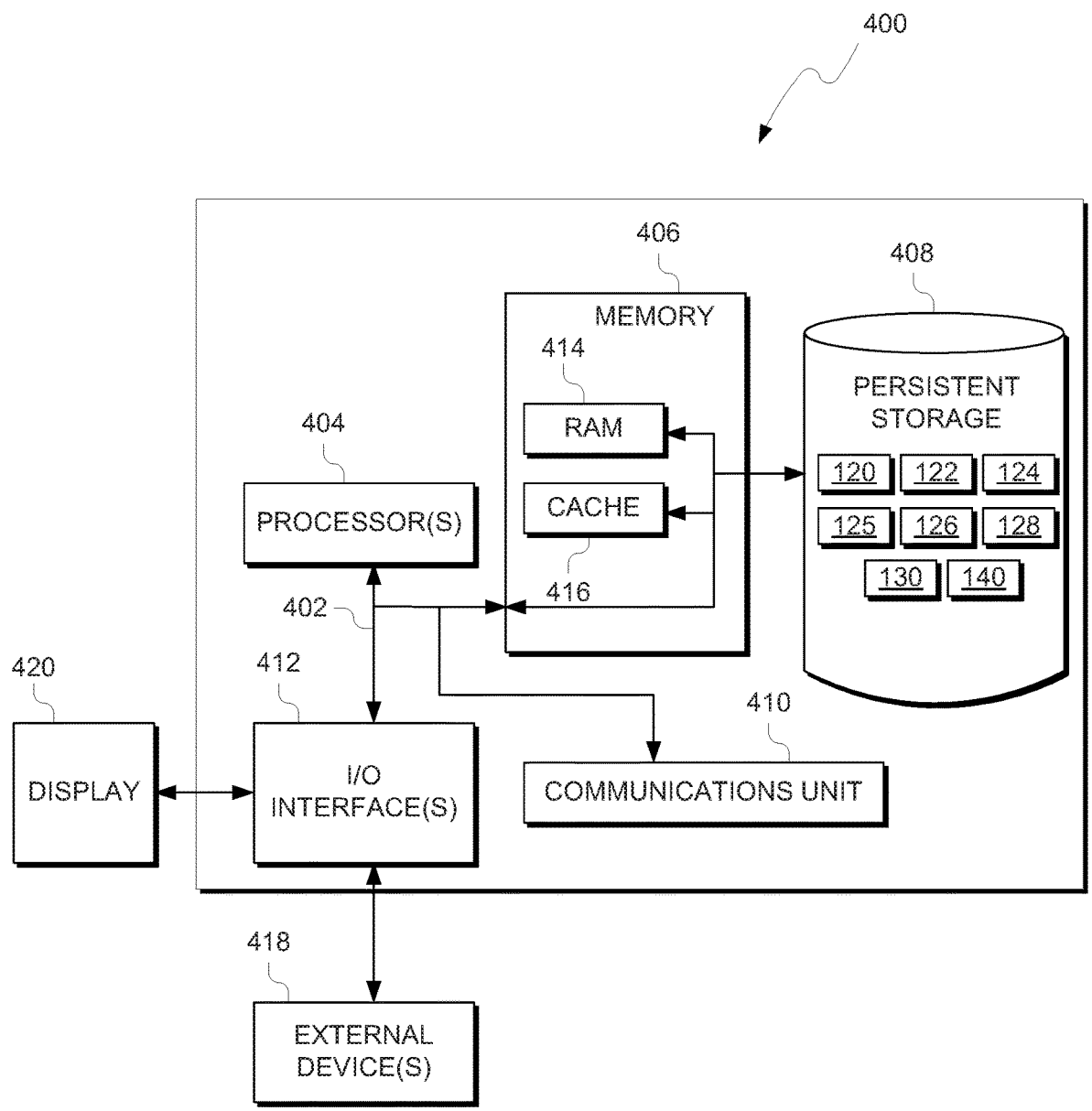
FIG. 4 depicts a block diagram of components of the computing device executing a print legibility program, in accordance with an exemplary embodiment of the present invention.

FIG. 4 depicts a block diagram, 400, of components of computing device 110, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 110 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Print legibility program 120, file data 130 and target data 140 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 150. In these examples, communications unit 410 includes one or more network interface cards. Communications unit 410 may provide communications through the use of either or both physical and wireless communications links. Print legibility program 120, file data 130 and target data 140 may be downloaded to persistent storage 408 through communications unit 410.

I/O interface(s) 412 allows for input and output of data with other devices that may be connected to computing device 110. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., print legibility program 120, file data 130 and target data 140, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method comprising:
    receiving, by one or more processors, a file to print to a target printing device;
    generating, by the one or more processors, a print preview of the file based, at least in part, on one or more configurations of the target printing device, wherein the print preview is generated at an initial scale;
    generating, by the one or more processors, a preview text for the print preview;
    determining, by the one or more processors, a plurality of legibility metrics based on a comparison between the preview text for the print preview and text of the file to print, wherein the plurality of legibility metrics correspond to a plurality of zones of the print preview; and
    in response to a legibility metric of the plurality of legibility metrics for a zone of the zones of the print preview being below a predetermined value, printing the zone of the file at a second scale, wherein the second scale is larger than the initial scale.

2. The method of claim 1, wherein the legibility metric is based, at least in part, on an edit distance between the preview text and the file text.

3. The method of claim 1, wherein the legibility metric is based, at least in part, on recalled n-grams between the preview text and the file text.

4. The method of claim 1, wherein the print preview is based, at least in part, on one or more of the following target printing device configurations: (i) print size; (ii) print area; and (iii) print resolution.

5. The method of claim 1, wherein the method further comprises:
    generating, by the one or more processors, a second print preview of the file, wherein the print preview is generated at the second scale;
    generating, by the one or more processors, a second preview text for the second print preview;
    determining, by the one or more processors, a second legibility metric based for the second print preview on a comparison between the second preview text and the text of the file to print; and
    in response to the second legibility metric being below a predetermined value, printing the file at a third scale, wherein the third scale is larger than the second scale.

* * * * *